United States Patent
Suzuki (10) Patent No.: US 7,425,770 B2
(45) Date of Patent: Sep. 16, 2008

(54) VIBRATION WAVE MOTOR

(75) Inventor: Masaharu Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 14 days.

(21) Appl. No.: 11/410,209

(22) Filed: Apr. 25, 2006

(65) Prior Publication Data
US 2006/0267416 A1 Nov. 30, 2006

(30) Foreign Application Priority Data
May 31, 2005 (JP) .............................. 2005-159856

(51) Int. Cl.
*H02P 9/04* (2006.01)
*H01L 41/00* (2006.01)
*H02N 2/00* (2006.01)

(52) U.S. Cl. .................................... 290/42; 310/323.16

(58) Field of Classification Search ............... 290/42; 310/323
See application file for complete search history.

(56) References Cited

U.S. PATENT DOCUMENTS

| 3,394,275 | A | * | 7/1968 | Lippmann | 310/329 |
| 4,453,103 | A | * | 6/1984 | Vishnevsky et al. | 310/323.02 |
| 4,562,374 | A | * | 12/1985 | Sashida | 310/328 |
| 4,703,214 | A | * | 10/1987 | Mishiro | 310/328 |
| 4,728,843 | A | * | 3/1988 | Mishiro | 310/325 |
| 4,752,711 | A | * | 6/1988 | Tsukimoto et al. | 310/323.11 |
| 4,857,793 | A | * | 8/1989 | Okuno | 310/323.02 |
| 4,868,446 | A | * | 9/1989 | Kumada | 310/323.02 |
| 4,893,046 | A | * | 1/1990 | Honda | 310/323.14 |
| 5,006,749 | A | * | 4/1991 | White | 310/323.03 |
| 5,039,899 | A | * | 8/1991 | Yamaguchi | 310/323.16 |
| 5,099,166 | A | * | 3/1992 | Hirano et al. | 310/323.08 |
| 5,128,580 | A | * | 7/1992 | Maeno et al. | 310/323.07 |
| 5,136,200 | A | * | 8/1992 | Takizawa et al. | 310/323.16 |
| 5,155,407 | A | * | 10/1992 | Kimura et al. | 310/323.07 |
| 5,191,688 | A | * | 3/1993 | Takizawa et al. | 29/25.35 |
| 5,274,295 | A | * | 12/1993 | Tsukimoto et al. | 310/323.15 |
| 5,298,829 | A | * | 3/1994 | Tsukimoto et al. | 310/323.04 |
| 5,300,850 | A | * | 4/1994 | Okumura et al. | 310/323.04 |
| 5,359,251 | A | * | 10/1994 | Tsukimoto et al. | 310/323.13 |
| 5,387,835 | A | * | 2/1995 | Tsukimoto et al. | 310/323.13 |

(Continued)

FOREIGN PATENT DOCUMENTS

JP 59-185179 10/1984

(Continued)

*Primary Examiner*—Thomas M. Dougherty
*Assistant Examiner*—Pedro J Cuevas
(74) *Attorney, Agent, or Firm*—Fitzpatrick, Cella, Harper & Scinto (57) ABSTRACT

Provided is a vibration wave motor including a pressurizing mechanism and a guide mechanism which are used for a moving member and can be thinned. The influence of a restoring force can be eliminated. The vibration wave motor includes an elastic vibration member which is composed of a permanent magnet and a piezoelectric element which are fixed to each other, a plurality of motion extraction portions provided on the permanent magnet, and a moving member which is pressurized to be in contact with the plurality of motion extraction portions. A closed magnetic circuit of a magnetic flux is formed to connect between the elastic vibration member and the moving member through the plurality of motion extraction portions. A flow direction of the magnetic flux passing through the moving member is aligned with a moving direction of the moving member.

8 Claims, 6 Drawing Sheets

U.S. PATENT DOCUMENTS

| | | | | |
|---|---|---|---|---|
| 5,410,204 A * | 4/1995 | Imabayashi et al. | .... | 310/323.13 |
| 5,436,522 A * | 7/1995 | Tsukimoto et al. | ..... | 310/323.12 |
| 5,506,462 A * | 4/1996 | Tamai et al. | ................. | 310/328 |
| 5,585,685 A * | 12/1996 | Maeno et al. | .......... | 310/323.02 |
| 5,610,468 A * | 3/1997 | Miyazawa et al. | ..... | 310/323.08 |
| 5,646,469 A * | 7/1997 | Tsukimoto et al. | ..... | 310/323.01 |
| 5,665,918 A * | 9/1997 | Takano et al. | .................. | 73/662 |
| 5,726,519 A * | 3/1998 | Gonnard et al. | ........ | 310/323.04 |
| 5,739,621 A * | 4/1998 | Atsuta et al. | .......... | 310/316.02 |
| 5,760,528 A * | 6/1998 | Tomikawa | ............ | 310/323.02 |
| 5,770,916 A * | 6/1998 | Ezaki et al. | ................. | 310/366 |
| 5,814,919 A * | 9/1998 | Okumura | ............... | 310/323.12 |
| 5,831,370 A * | 11/1998 | Sugaya | .................. | 310/323.01 |
| 5,854,529 A * | 12/1998 | Ashizawa et al. | ...... | 310/323.01 |
| 5,872,417 A * | 2/1999 | Sugaya | .................. | 310/323.17 |
| 5,912,525 A * | 6/1999 | Kobayashi et al. | ..... | 310/323.03 |
| 5,917,268 A * | 6/1999 | Takagi | ........................ | 310/317 |
| 5,936,328 A * | 8/1999 | Takano et al. | .......... | 310/323.02 |
| 6,051,911 A * | 4/2000 | Kojima et al. | ............... | 310/366 |
| 6,184,609 B1* | 2/2001 | Johansson et al. | ........... | 310/328 |
| 6,191,520 B1* | 2/2001 | Maruyama et al. | ..... | 310/323.06 |
| 6,198,201 B1* | 3/2001 | Okumura | ............... | 310/323.03 |
| 6,211,603 B1* | 4/2001 | Iino et al. | .............. | 310/323.02 |
| 6,252,333 B1* | 6/2001 | Iino et al. | .............. | 310/323.17 |
| 6,380,660 B1* | 4/2002 | Maeno et al. | .......... | 310/323.02 |
| 6,404,104 B1* | 6/2002 | Maeno et al. | .......... | 310/323.02 |
| 6,781,283 B2* | 8/2004 | Tsukimoto | ............. | 310/323.16 |
| 6,819,029 B2* | 11/2004 | Ohno et al. | ............ | 310/323.17 |
| 6,888,288 B2* | 5/2005 | Seki et al. | .............. | 310/323.16 |
| 6,930,436 B2* | 8/2005 | Tsukimoto et al. | ...... | 310/323.02 |
| 6,949,868 B2* | 9/2005 | Iseki | ...................... | 310/323.02 |
| 6,989,624 B2* | 1/2006 | Tsukimoto et al. | ...... | 310/323.12 |
| 7,061,159 B2* | 6/2006 | Funakubo | ............... | 310/323.12 |
| 7,081,700 B2* | 7/2006 | Okumura et al. | ........ | 310/323.17 |
| 7,109,639 B2* | 9/2006 | Yamamoto et al. | ..... | 310/323.16 |
| 7,122,940 B2* | 10/2006 | Okumura et al. | ........ | 310/323.17 |
| 7,148,605 B2* | 12/2006 | Biegelsen et al. | ....... | 310/323.16 |
| 7,215,063 B2* | 5/2007 | Tsukimoto et al. | ...... | 310/323.12 |
| 7,233,096 B2* | 6/2007 | Maruyama et al. | ..... | 310/323.02 |
| 7,268,464 B2* | 9/2007 | Kishi | ..................... | 310/323.02 |
| 7,317,291 B2* | 1/2008 | Atsuta et al. | ................. | 318/119 |
| 7,352,109 B2* | 4/2008 | Ryu et al. | .............. | 310/323.01 |
| 7,355,802 B2* | 4/2008 | Homme | ...................... | 359/824 |
| 7,365,474 B2* | 4/2008 | Yamamoto et al. | .......... | 310/317 |
| 2007/0188051 A1* | 8/2007 | Kobayashi et al. | ...... | 310/323.11 |
| 2008/0061654 A1* | 3/2008 | Matsuo | ................... | 310/323.01 |
| 2008/0073999 A1* | 3/2008 | Wischnewskij et al. | | 310/323.03 |
| 2008/0074000 A1* | 3/2008 | Bennett et al. | .............. | 310/328 |
| 2008/0122316 A1* | 5/2008 | Ue et al. | ...................... | 310/318 |

FOREIGN PATENT DOCUMENTS

| | | |
|---|---|---|
| JP | 4-88890 | 3/1992 |
| JP | 6-292374 | 10/1994 |
| JP | 6-311765 | 11/1994 |
| JP | 7-143770 | 6/1995 |
| JP | 7-143771 | 6/1995 |
| JP | 11-285279 | 10/1999 |
| JP | 2004-257844 | 9/2004 |

* cited by examiner

VIBRATION WAVE MOTOR

BACKGROUND OF THE INVENTION

1. Field of the Invention

The present invention relates to a vibration wave motor, and more particularly, to a vibration wave motor for driving a moving member by an elastic vibration member excited with a plurality of vibration modes.

2. Related Background Art

Up to now, the following vibration wave motors have been known. In the vibration wave motors, a plurality of vibrations obtained with a plurality of vibration modes are synthesized and a plate-shaped elastic vibration member is driven by the synthesized vibrations, thereby driving a moving member which is pressurized against the elastic vibration member into frictional contact therewith. As a representative example of the vibration wave motors, JP 6-311765 A discloses a vibration wave motor in which two bending vibration modes are synthesized.

In addition, JP 7-143771 A discloses a vibration wave motor in which a longitudinal vibration mode and a bending vibration mode are synthesized.

As an example of a pressurizing method of causing friction between the elastic vibration member and the moving member in such the vibration wave motor, JP 7-143770 A discloses a mechanical method using a spring or the like.

As disclosed in JP 59-185179 A, JP 4-088890 A, and JP 6-292374 A, there is also known a method using a magnetic force.

JP 11-285279 A and JP 2004-257844 A each propose a device for pressurizing the moving member by a magnetic force and guiding the moving member in a moving direction.

The largest feature of the plate-shaped vibration wave motor disclosed in each of, for example, JP 6-311765 A and JP 7-143771 A is that the vibration wave motor can be thinned.

In order to make full use of this feature, it is necessary to devise a pressurizing mechanism and a guide mechanism for the moving member.

For example, JP 7-143770 A discloses the pressurizing mechanism and the guide mechanism which are based on the mechanical method. However, it is difficult to thin the vibration wave motor.

Each of, for example, JP 59-185179 A, JP 4-088890 A, or JP 6-292374 A discloses the pressurizing mechanism using a magnetic force. The pressurizing mechanism is effective in thinning. However, the guide mechanism is not considered.

For example, JP 11-285279 A and JP 2004-257844 A each propose the device in which both the pressurizing mechanism and the guide mechanism of the vibration wave motor are constructed using a magnetic force.

That is, the device for performing pressurization by the magnetic force with a state in which the flow of magnetic flux of a permanent magnet is provided to be a closed magnetic circuit as proposed in JP 11-285279 A is desirable in view of the effective use of magnetic force. However, in order to form the closed magnetic circuit, it is necessary to oppose a square U-shaped linear guide and a square U-shaped yoke to each other, so that it is unsuitable to thin the device. The guide mechanism requires specific parts, which is disadvantageous in cost.

JP 2004-257844 A proposes a device for performing pressurization and guiding by the attractions of both strip-shaped permanent magnets with a state in which the permanent magnets are opposed to each other. Although a problem does not occur in the case of a rotational motor, when the attractions of the two combined permanent magnets are used in a linear motor, the following problems occur.

Figure 7A:
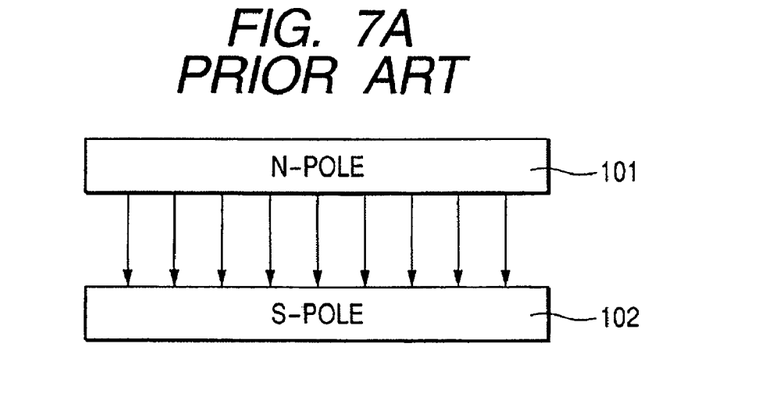
FIG. 7A is a side view showing a state in which a magnetic reluctance of two strip-shaped permanent magnets corresponding to parts of a conventional linear vibration wave motor becomes a minimum.
Figure 7B:
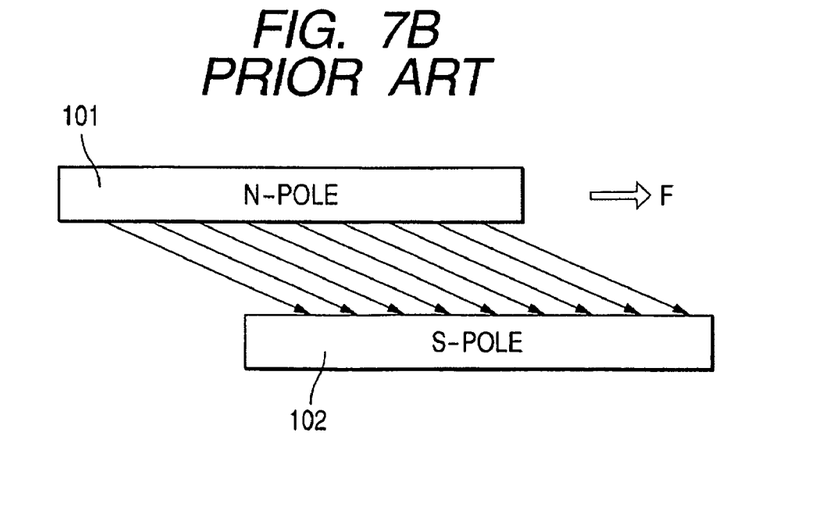
FIG. 7B is a side view showing a state in which the magnetic reluctance of the two strip-shaped permanent magnets is higher than that in the state shown in FIG. 7A.

FIGS. 7A and 7B are side views showing two strip-shaped permanent magnets corresponding to parts of a conventional linear vibration wave motor.

For example, a permanent magnet (N-pole) 101 is fixed to a moving member and a permanent magnet (S-pole) 102 is fixed to an elastic vibration member. The permanent magnet (N-pole) 101 and the permanent magnet (S-pole) 102 are opposed to each other at a predetermined interval.

In general, a magnetic flux tries to flow so as to minimize a magnetic reluctance. When a relative positional relation between the permanent magnet (N-pole) 101 and the permanent magnet (S-pole) 102 is a positional relation shown in FIG. 7A, the magnetic reluctance becomes minimum. In contrast to this, when the permanent magnet (N-pole) 101 and the permanent magnet (S-pole) 102 are in a relative positional relation shown in FIG. 7B, the magnetic reluctance increases, with the result that the magnetic force acts in a direction in which the permanent magnets try to return to the position in which the magnetic reluctance is minimum. Therefore, a restoring force F acts on the permanent magnet (N-pole) 101. The restoring force F becomes larger as a shift amount from the position in which the magnetic reluctance is minimum as shown in FIG. 7A increases. As a result, when a stroke of the moving member lengthens, it is necessary that the elastic vibration member produces a thrust force for canceling the restoring force F in the position.

When an operation is performed in which the moving member which is stopping in a position shifted from the position in which the magnetic reluctance is a minimum as shown in FIG. 7A is returned toward the position in which the magnetic reluctance is a minimum by a very small amount, there is also a problem in that the moving member overruns an instructed position because of the restoring force F.

Figure 8A:
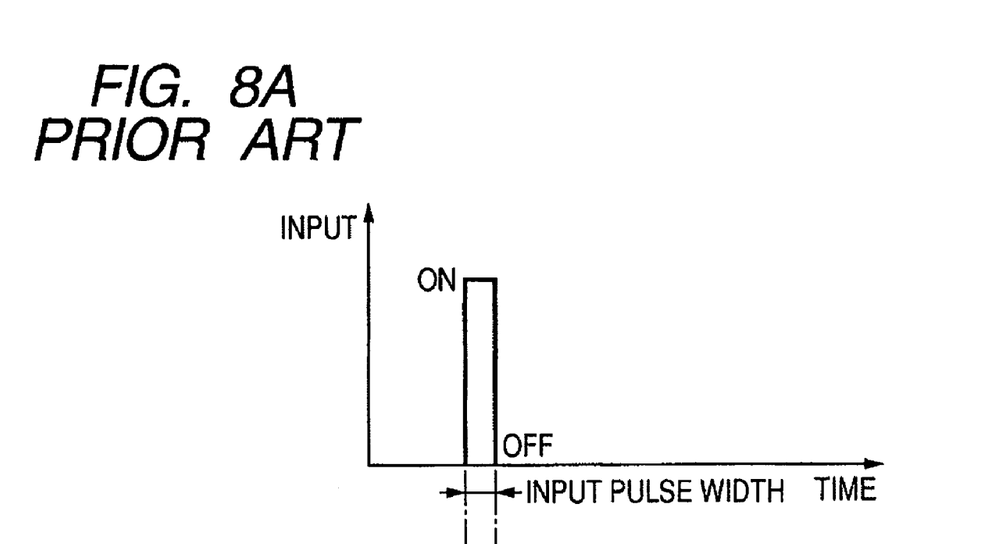
FIG. 8A shows a drive pulse signal inputted to a conventional linear vibration wave motor when a moving member overruns in the conventional linear vibration wave motor.
Figure 8B:
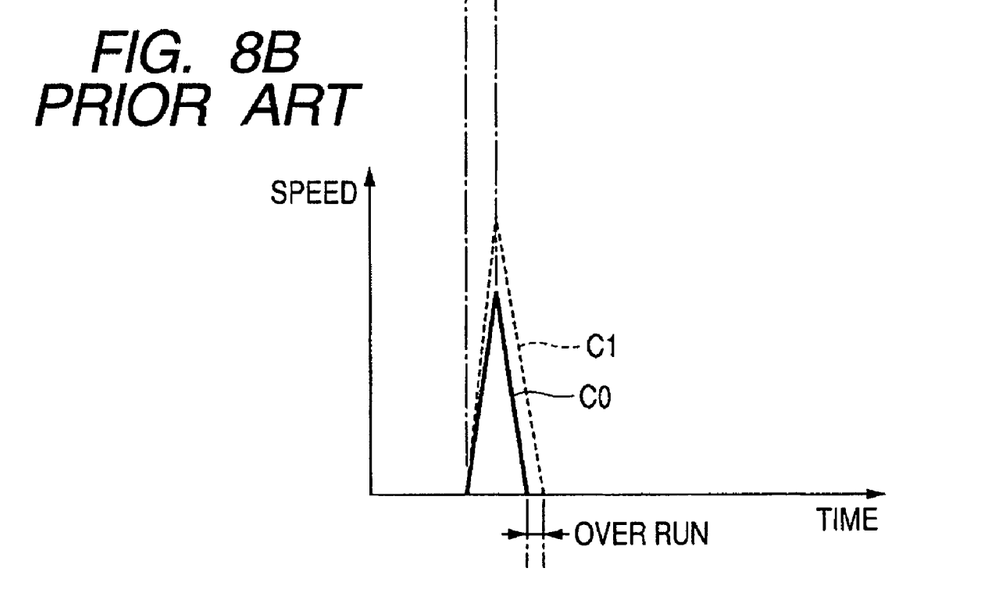
FIG. 8B shows a change in moving speed of the moving member when the vibration wave motor is operated at this time.

FIGS. 8A and 8B show an overrun of the moving member in a conventional linear vibration wave motor. FIG. 8A shows a drive pulse signal inputted to the vibration wave motor. FIG. 8B shows a change in moving speed of the moving member when the vibration wave motor is operated based on the drive pulse signal.

In FIG. 8B, a characteristic C0 indicates an ideal moving speed in the case where there is no restoring force F. On the other hand, a characteristic C1 indicates a moving speed in the case where there is the restoring force F. The characteristic C1 exhibits the overrun as compared with the characteristic C0.

SUMMARY OF THE INVENTION

According to one aspect of the present invention, a vibration wave motor includes: an elastic vibration member including a permanent magnet and an electro-mechanical energy conversion element which are fixed to each other; a plurality of motion extraction portions provided on the elastic vibration member; and a moving member pressurized to the plurality of motion extraction portions into contact therewith. In the vibration wave motor, a closed magnetic circuit of a magnetic flux is formed to connect between the elastic vibration member and the moving member through the plurality of motion extraction portions, and a flow direction of the magnetic flux passing through the moving member is aligned with a moving direction of the moving member.

The above and other objects, features, and advantages of the invention will become more apparent from the following detailed description taken in conjunction with the accompany drawings.

DESCRIPTION OF THE PREFERRED EMBODIMENTS

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate.

Hereinafter, best modes for carrying out the present invention will be described with reference to the accompanying drawings.

First Embodiment

Figures 1A, 1B:
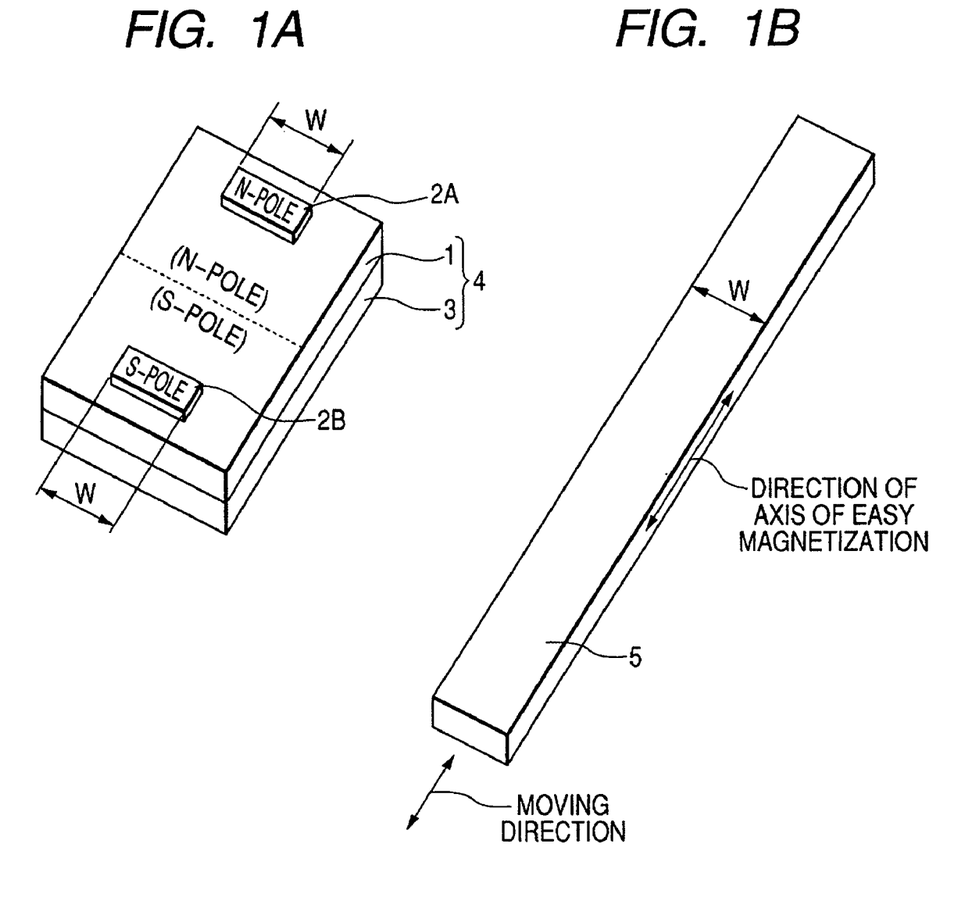
FIG. 1A is a perspective view showing a structure of an elastic vibration member of a vibration wave motor according to a first embodiment of the present invention.
FIG. 1B is a perspective view showing a moving member of the vibration wave motor.

FIGS. 1A and 1B are perspective views showing a structure of a vibration wave motor according to a first embodiment of the present invention. The vibration wave motor is a linear vibration wave motor. FIG. 1A shows an elastic vibration member and FIG. 1B shows a moving member.

In FIG. 1A, reference numeral 1 denotes a permanent magnet and 3 denotes a piezoelectric element which acts as an electro-mechanical energy conversion element. An elastic vibration member 4 includes the permanent magnet 1 and the piezoelectric element 3. The permanent magnet 1 is subjected to one-sided two-pole magnetization. A plurality of motion extraction portions 2A and 2B are provided on one surface of the permanent magnet 1 which is subjected to the one-sided two-pole magnetization, and the piezoelectric element 3 is fixed to the other surface thereof by, for example, bonding. The motion extraction portion 2A is magnetized to an N-pole and fixed to an N-pole side of the permanent magnet 1. The motion extraction portion 2B is magnetized to an S-pole and fixed to an S-pole side of the permanent magnet 1.

An electrical electrode pattern (not shown) for exciting the piezoelectric element 3 with a plurality of vibration modes is formed on one surface of the piezoelectric element 3, which is opposed to the other surface thereof that is bonded to the permanent magnet 1. When a high-frequency alternating voltage is applied from an external power source (not shown) to the electrical electrode pattern, the piezoelectric element 3 is vibrated with the plurality of vibration modes to spheroidally move the plurality of motion extraction portions 2A and 2B.

Figure 2:
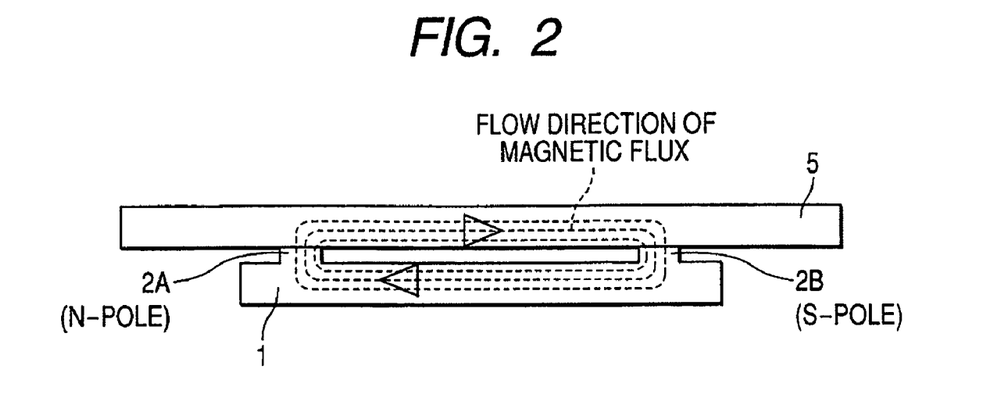
FIG. 2 is a side view showing a positional relation among a permanent magnet, a motion extraction portion, and a moving member.

In FIG. 1B, reference numeral 5 denotes a moving member whose raw material is a grain-oriented magnetic steel sheet. A moving direction of the moving member 5 is aligned with a direction of an axis of easy magnetization of the grain-oriented magnetic steel sheet. As shown in FIG. 2A, the moving member 5 is placed on the elastic vibration member 4 so as to be in contact with the motion extraction portions 2A and 2B. A width of the moving member 5 in a direction orthogonal to the moving direction of the moving member 5 is made equal to a width of the motion extraction portions 2A and 2B (width in a direction orthogonal to a magnetic pole direction of the permanent magnet 1) at least within a moving stroke. That is, each of the widths is set to a contact width W. The width of the moving member 5 is not necessarily made equal to the width of the motion extraction portions 2A and 2B. However, when both the widths are made equal to each other, pressurization action can be most efficiently caused between the motion extraction portions 2A and 2B and the moving member 5.

FIG. 2 is a side view showing a positional relation among the permanent magnet 1, the motion extraction portions 2A and 2B, and the moving member 5.

In the vibration wave motor (linear vibration wave motor) according to the first embodiment, the motion extraction portions 2A and 2B provided on the permanent magnet 1 are in contact with the moving member 5. Therefore, the following closed magnetic circuit of a magnetic flux is formed. A magnetic flux from the motion extraction portion 2A (N-pole) flows into the moving member 5 in the same direction as the moving direction of the moving member 5 and enters the motion extraction portion 2B (S-pole). Then, the magnetic flux flows from the S-pole of the permanent magnet 1 into the N-pole and returns to the motion extraction portion 2A (N-pole).

When the closed magnetic circuit of the magnetic flux is formed, the magnetic flux concentrates on contact surfaces between each of the motion extraction portions 2A and 2B and the moving member 5. Therefore, the efficient pressurization of the moving member 5 to the motion extraction portions 2A and 2B is possible.

The magnetic flux continuously concentrates on the contact surfaces and flows through the moving member 5, so that a magnetic reluctance becomes constant. Therefore, when the moving member 5 moves relative to the elastic vibration member 4, the restoring force F in the moving direction as shown in FIG. 7B is not generated even in a case where contact positions with the motion extraction portions 2A and 2B change.

A flow direction of the magnetic flux is aligned with the moving direction of the moving member 5, so the magnetic reluctance becomes a minimum even in the direction orthogonal to the moving direction of the moving member 5. When the moving member 5 moves in the direction orthogonal to the moving direction, there is a change in which the magnetic reluctance increases. Therefore, an aligning force to the change is generated, so that a lateral deviation from the moving direction can be prevented. Thus, it is unnecessary to provide a guide mechanism for the moving member 5, with the result that the number of parts can be reduced.

The width of the moving member 5 in the direction orthogonal to the moving direction of the moving member 5 and the width of the motion extraction portions 2A and 2B each are made equal to the contact width W at least within the moving stroke. Therefore, when the moving member 5 is laterally deviated from the moving direction, a change in magnetic reluctance becomes significant. Thus, the responsibility of the aligning force can be improved to produce a magnetic guide with high precision.

The permanent magnet 1 used as a part of the elastic vibration member 4 can be also constructed using a sintered magnet manufactured by a powder sintering method. However, the sintered magnet can easily crack or chip, so that the percentage of defects at the time of mechanical processing or assembly is high. In addition, the elastic limit of the sintered magnet is low, so there is a disadvantage that the sintered magnet breaks when it is deformed with a large displacement.

Therefore, the permanent magnet 1 of this embodiment is constructed using an iron-chromium-cobalt (Fe—Cr—Co) cast magnet. Although the Fe—Cr—Co cast magnet is a magnet, it has the same quality as that of a normal metal material, can be subjected to cut processing or plastic processing, and has a high elastic limit. The motion extraction portions 2A and 2B can be formed on the Fe—Cr—Co cast magnet by etching or the like, so that it is suitable to use the Fe—Cr—Co cast magnet as the permanent magnet 1.

It is also expected to use a method of forming the motion extraction portions 2A and 2B using members different from the permanent magnet 1 made of a soft magnetic member (such as an iron alloy) and coupling the formed motion extraction portions 2A and 2B to the flat permanent magnet 1 by bonding or the like. However, this is not desirable in view of reliability with respect to the imposition precision of the motion extraction portions 2A and 2B and the bonding strength thereof.

Figure 3:
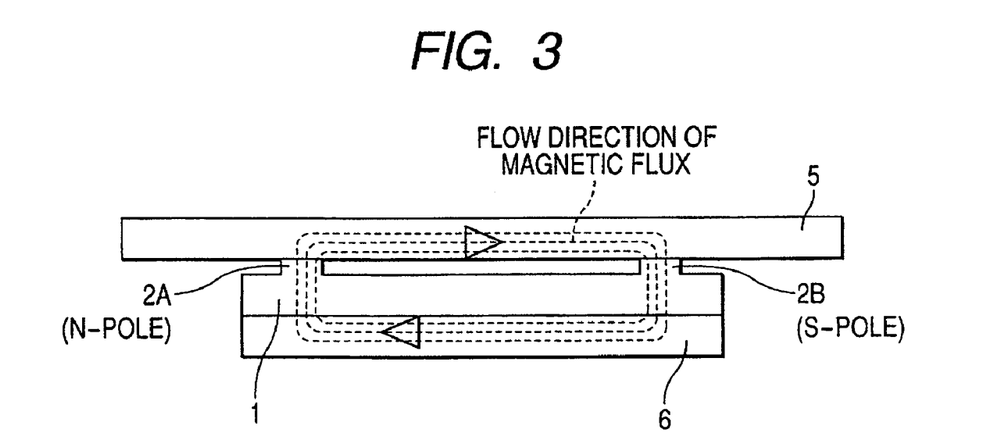
FIG. 3 is a side view showing a vibration wave motor in which a back yoke is bonded between the permanent magnet and a piezoelectric element and the permanent magnet is subjected to longitudinal two-pole magnetization.

In the first embodiment, the example in which the permanent magnet 1 is subjected to the one-sided two-pole magnetization is described. As shown in FIG. 3, a back yoke 6 made of a soft magnetic member may be fixed between the permanent magnet 1 and the piezoelectric element 3 (not shown in FIG. 3) by, for example, bonding and the permanent magnet 1 may be longitudinal two-pole magnetization. Therefore, a closed magnetic circuit of a magnetic flux passing through the back yoke 6 is formed, so that a stronger attraction is generated between the moving member 5 and each of the motion extraction portions 2A and 2B as compared with the structure shown in FIG. 2.

Any member made of the soft magnetic member sufficiently acts as the moving member 5. It is effective in magnetic efficiency and cost to employ a magnetic steel sheet widely used for an electromagnetic motor or an electromagnetic transformer, particularly, a grain-oriented magnetic steel sheet for the linear vibration wave motor.

According to the description of the first embodiment, it is assumed that the moving member 5 moves relative to the elastic vibration member 4. A structure in which the elastic vibration member 4 moves relative to the moving member 5 may be employed.

In the first embodiment, the permanent magnet 1 and the piezoelectric element 3 each have a plate shape. In addition to this, for example, the moving member can be bonded to a spherical member to obtain a bow shape or the permanent magnet and the piezoelectric element can be further thickened to obtain a column shape.

In the first embodiment, the permanent magnet 1 and the piezoelectric element 3 are fixed to each other by, for example, bonding. However, it is preferable that the piezoelectric element may be sandwiched between the permanent magnet 1 and a different member to fix the permanent magnet and the piezoelectric element.

Second Embodiment

Figure 4A:
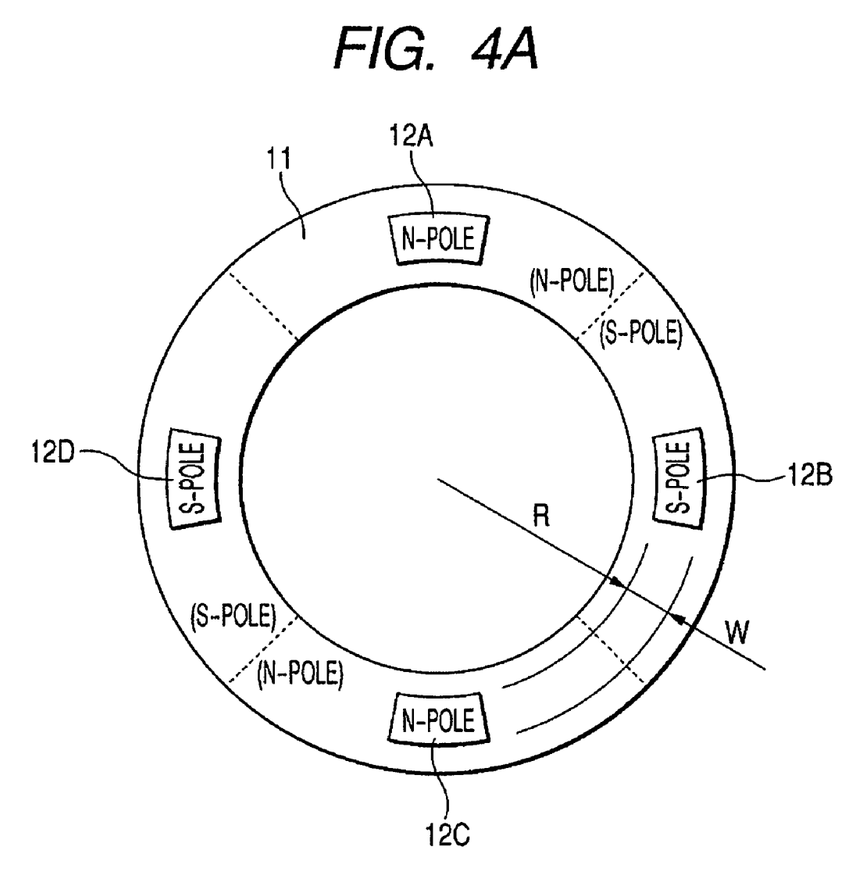
FIG. 4A is a plan view showing a structure of an elastic vibration member of a vibration wave motor according to a second embodiment of the present invention.
Figure 4B:
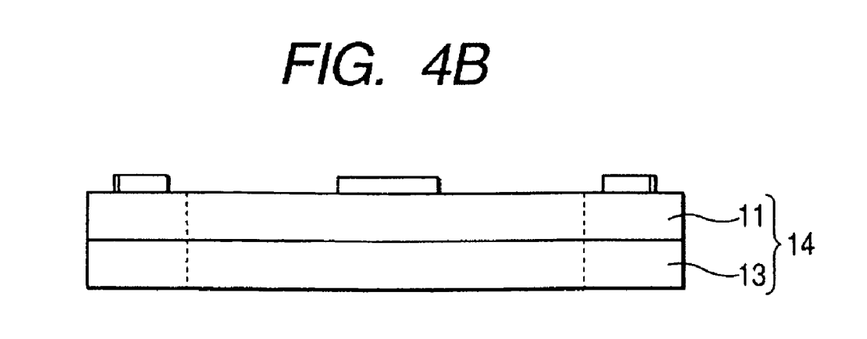
FIG. 4B is a side view thereof.

FIGS. 4A and 4B are a plan view and a side view, respectively, showing a structure of an elastic vibration member of a vibration wave motor according to a second embodiment of the present invention. The vibration wave motor is a rotational vibration wave motor.

Reference numeral 11 denotes a disk-shaped permanent magnet and 13 denotes a disk-shaped piezoelectric element. A disk-shaped elastic vibration member 14 includes the disk-shaped permanent magnet 11 and the disk-shaped piezoelectric element 13.

The disk-shaped permanent magnet 11 is subjected to one-sided four-pole magnetization. A plurality of motion extraction portions 12A, 12B, 12C, and 12D are provided on one surface of the disk-shaped permanent magnet 11 which is subjected to the one-sided four-pole magnetization along a circumferential direction of the disk-shaped permanent magnet 11, and the disk-shaped piezoelectric element 13 is fixed to the other surface thereof by, for example, bonding. The motion extraction portion 12A is magnetized to an N-pole and fixed to an N-pole side of the disk-shaped permanent magnet 11. The motion extraction portions 12B is magnetized to an S-pole and fixed to an S-pole side of the disk-shaped permanent magnet 11. The motion extraction portions 12C is magnetized to the N-pole and fixed to the N-pole side of the disk-shaped permanent magnet 11. The motion extraction portions 12D is magnetized to the S-pole and fixed to the S-pole side of the disk-shaped permanent magnet 11.

An electrical electrode pattern (not shown) for exciting the disk-shaped piezoelectric element 13 with a plurality of vibration modes is formed on one surface of the disk-shaped piezoelectric element 13 which is opposed to the other surface thereof which is bonded to the disk-shaped permanent magnet 11. When a high-frequency alternating voltage is applied from an external power source (not shown) to the electrical electrode pattern, the disk-shaped piezoelectric element 13 is vibrated with the plurality of vibration modes to spheroidally move the motion extraction portions 12A, 12B, 12C and 12D.

Figure 5A:
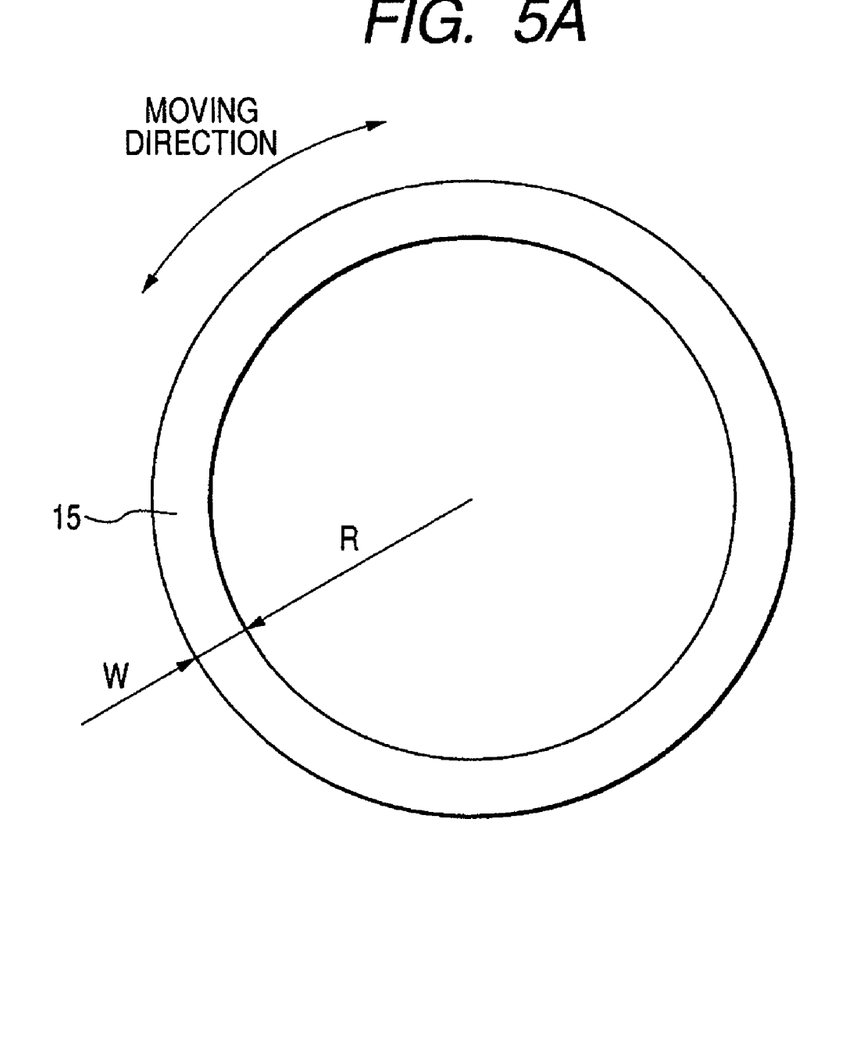
FIG. 5A is a plan view showing a structure of a rotational moving member of the vibration wave motor according to the second embodiment.
Figure 5B:
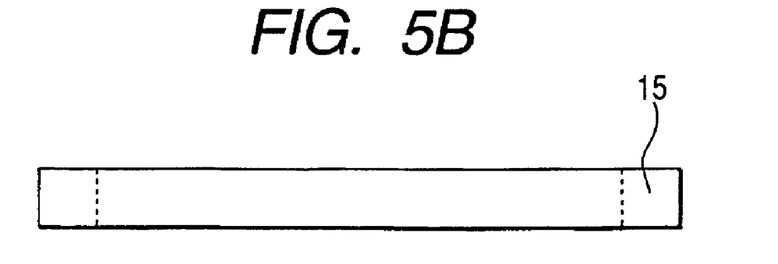
FIG. 5B is a side view thereof.

FIGS. 5A and 5B are a plan view and a side view, respectively, showing a structure of a rotational moving member of the vibration wave motor according to the second embodiment.

Figure 6:
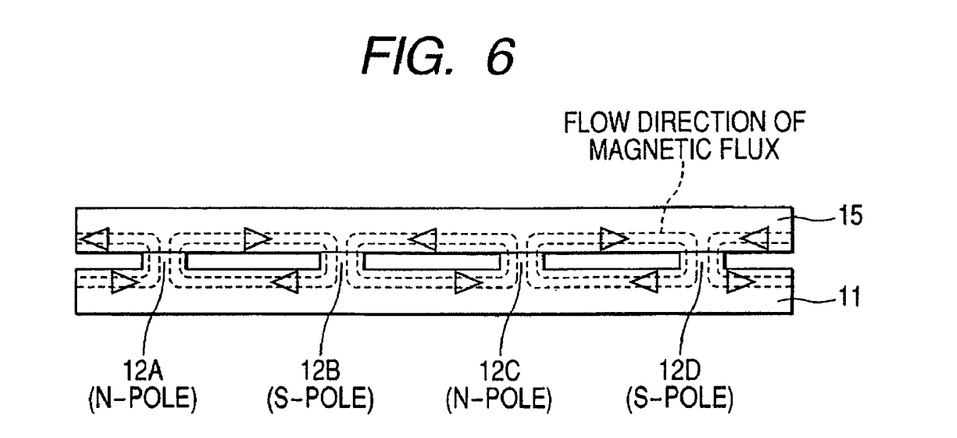
FIG. 6 is a side view developed in a circumferential direction, showing a positional relation among a disk-shaped permanent magnet, motion extraction portions, and a rotational moving member.

In FIGS. 5A and 5B, reference numeral 15 denotes a rotational moving member whose raw material is a non-oriented magnetic steel sheet. It is not preferable that the grain-oriented magnetic steel sheet be used for the rotational moving member 15. As shown in FIG. 6, the rotational moving member 15 is placed on the disk-shaped elastic vibration member 14 so as to be in contact with the motion extraction portions 12A, 12B, 12C, and 12D. A width of the rotational moving member 15 in a direction orthogonal to a circumferential direction (radius direction) of the rotational moving member 15 is made equal to a width of the motion extraction portions 12A, 12B, 12C, and 12D (width in the radius direction of the disk-shaped permanent magnet 11) at least within a moving stroke. That is, each of the widths is set to the contact width W.

FIG. 6 is a side view developed in the circumferential direction, showing a positional relation among the disk-shaped permanent magnet 11, the motion extraction portions 12A, 12B, 12C, and 12D, and the rotational moving member 15.

In the vibration wave motor (rotational vibration wave motor) according to the second embodiment, the motion extraction portions 12A, 12B, 12C, and 12D provided on the disk-shaped permanent magnet 11 are in contact with the rotational moving member 15. Therefore, the following closed magnetic circuit of a magnetic flux is formed. A magnetic flux from the motion extraction portion 12A (N-pole) and the motion extraction portion 12C (N-pole) flows into the rotational moving member 15 in the same direction as the moving direction of the rotational moving member 15 and enters each of the motion extraction portion 12D (S-pole) and the motion extraction portion 12B (S-pole). Then, the magnetic flux flows from the S-pole of the disk-shaped permanent magnet 11 into the N-pole and returns to each of the motion extraction portion 12A (N-pole) and the motion extraction portion 12C (N-pole).

When the closed magnetic circuit of the magnetic flux is formed, the magnetic flux concentrates on contact surfaces between each of the motion extraction portions 12A, 12B, 12C, and 12D and the rotational moving member 15. Therefore, the efficient pressurization of the rotational moving member 15 to the motion extraction portions 12A, 12B, and 12D is possible.

The magnetic flux continuously concentrates on the contact surfaces and flows through the moving member 5, so a magnetic reluctance becomes constant. Therefore, when the moving member 5 moves relative to the elastic vibration member 4, the restoring force F in the moving direction as shown in FIG. 7B does not generate even in the case where contact positions with the motion extraction portions 2A and 2B change.

A flow direction of the magnetic flux is aligned with the rotation direction (moving direction) of the rotational moving member 15, so the magnetic reluctance becomes a minimum even in a radius direction of the rotational moving member 15. When the rotational moving member 15 moves in the radius direction, there is a change in which the magnetic reluctance increases. Therefore, an aligning force to the change is generated, so that a lateral deviation from the rotation direction can be prevented. Thus, it is unnecessary to provide a guide mechanism for the rotational moving member 15, with the result that the number of parts can be reduced.

The width of the rotational moving member 15 in the radius direction of the rotational moving member 15 and the width of the motion extraction portions 12A, 12B, 12C, and 12D each are made equal to the contact width W at least within the moving stroke. Therefore, when the rotational moving member 15 is laterally deviated from the rotation direction, a change in magnetic reluctance becomes significant. Thus, the responsibility of the aligning force can be improved to produce a magnetic guide with high precision.

As many apparently widely different embodiments of the present invention can be made without departing from the sprit and scope thereof, it is to be understood that the invention is not limited to the specific embodiment thereof except as defined in the appended claims.

This application claims priority from Japanese Patent Application No. 2005-159856 filed on May 31, 2005, which is hereby incorporated by reference herein.

What is claimed is:

1. A vibration wave motor, comprising:
   an elastic vibration member including a permanent magnet and an electro-mechanical energy conversion element which are fixed to each other;
   a first motion extraction portion and a second motion extraction portion, which are provided on the elastic vibration member; and
   a moving member pressurized to contact the first and the second motion extraction portions, the moving member being driven by a vibration generated on the elastic vibration member, the vibration being generated by applying an alternating signal onto the electro-mechanical energy conversion element, wherein:
   a magnetic flux from the first motion extraction portion flows within the moving member, flows within the second motion extraction portion, and returns to the first motion extraction portion, so as to make a closed magnetic circuit of the magnetic flux, and
   a flow direction of the magnetic flux passing through the moving member is aligned with a moving direction of the moving member.

2. A vibration wave motor according to claim 1, wherein the elastic vibration member generates vibrations corresponding to a plurality of vibration modes to spheroidally move the first and second motion extraction portions by synthesization of the vibrations.

3. A vibration wave motor according to claim 1, wherein contact widths between the moving member and the first and second motion extraction portions in a direction orthogonal to the moving direction of the moving member are equal to each other to form a magnetic circuit in which the magnetic flux concentratedly flows through the moving member and the first and second motion extraction portions.

4. A vibration wave motor according to claim 1, wherein the first and second motion extraction portions are magnetized to alternately reverse poles.

5. A vibration wave motor according to claim 1, wherein:
   the moving member is made of a grain-oriented magnetic steel sheet; and
   the moving direction of the moving member is aligned with a direction of an axis of easy magnetization to perform linear driving.

6. A vibration wave motor according to claim 1, wherein:
   the moving member is made of a non-oriented magnetic steel sheet;
   each of the moving member and the elastic vibration member is formed in a disk shape; and
   the moving member is rotated by the elastic vibration member.

7. A vibration wave motor according to claim 1, wherein:
   the permanent magnet included in the elastic vibration member is subjected to one-sided two-pole magnetization; and
   the first and second motion extraction portions are fixed to the permanent magnet corresponding to poles thereof.

8. A vibration wave motor according to claim 1, further comprising:
   a soft magnetic member located between the permanent magnet included in the elastic vibration member and the electro-mechanical energy conversion element;
   the permanent magnet subjected to two-pole magnetization in a thickness direction; and
   a closed magnetic circuit of a magnetic flux which is formed to connect between the soft magnetic member and the moving member through the first and second motion extraction portions and the permanent magnet.

* * * * *

UNITED STATES PATENT AND TRADEMARK OFFICE
CERTIFICATE OF CORRECTION

PATENT NO. : 7,425,770 B2 Page 1 of 1
APPLICATION NO. : 11/410209
DATED : September 16, 2008
INVENTOR(S) : Masaharu Suzuki It is certified that error appears in the above-identified patent and that said Letters Patent is hereby corrected as shown below:

Column 1
Line 26, "the" should read --a--.

Column 6
Line 34, "portions" should read --portion--.
Line 37, "portions" should read --portion--.

Column 7
Line 36, "does not generate" should read --is not generated--.

Signed and Sealed this

Seventeenth Day of February, 2009

JOHN DOLL
*Acting Director of the United States Patent and Trademark Office*